United States Patent
Thierion

(10) Patent No.: US 8,649,432 B2
(45) Date of Patent: Feb. 11, 2014

(54) PROCESS FOR CONTROLLING THE HSDPA DOWNLINK DATA RATE RECEIVED BY A USER EQUIPMENT

(75) Inventor: Philippe Thierion, Grasse (FR)

(73) Assignees: ST-Ericsson SA, Plan-les-Ouates (CH); ST-Ericsson (France) SAS, Grenoble (FR)

(*) Notice: Subject to any disclaimer, the term of this patent is extended or adjusted under 35 U.S.C. 154(b) by 44 days.

(21) Appl. No.: 13/382,423

(22) PCT Filed: Jul. 6, 2010

(86) PCT No.: PCT/EP2010/004077
§ 371 (c)(1),
(2), (4) Date: Feb. 27, 2012

(87) PCT Pub. No.: WO2011/003572
PCT Pub. Date: Jan. 13, 2011

(65) Prior Publication Data
US 2012/0140634 A1 Jun. 7, 2012

(30) Foreign Application Priority Data
Jul. 7, 2009 (EP) .................................. 09368022

(51) Int. Cl.
*H04N 11/04* (2006.01)
(52) U.S. Cl.
USPC ..................................... 375/240.05; 370/389
(58) Field of Classification Search
USPC ................. 370/235, 252, 332, 333, 349, 389; 375/240.05, 240.07, 240.24
See application file for complete search history.

(56) References Cited

U.S. PATENT DOCUMENTS

| | | | |
|---|---|---|---|
| 7,539,497 B2* | 5/2009 | Beale | 455/451 |
| 8,159,981 B2* | 4/2012 | Ishizaki | 370/310 |
| 2005/0120343 A1 | 6/2005 | Tai et al. | |
| 2005/0138671 A1 | 6/2005 | Love et al. | |
| 2006/0165091 A1 | 7/2006 | Arima et al. | |
| 2008/0146215 A1 | 6/2008 | Oota | |

OTHER PUBLICATIONS

International Preliminary Report on Patentability issued on Jan. 10, 2012 in corresponding International application No. PCT/EP2010/004077.
QUALCOMM: "Generic NACK compared with PLI and SLI" 3GPP Draft; S4-060614_GNACK_QCOM, 3rd Generation Partnership Project (3GPP), Mobile Competence Centre; 650, Route des Lucioles; F-06921 Sophia-Antipolis Cedex; France, vol. SA WG4, No. Athens, Greece; Nov. 1, 2006, entire document.

(Continued)

*Primary Examiner* — Brenda H Pham
(74) *Attorney, Agent, or Firm* — Patent Portfolio Builders PLLC

(57) ABSTRACT

A process for allowing a User Equipment (UE) in a wireless communication network to control the HSDPA downlink data rate received from a NodeB, said UE successively receiving blocks of data having a predetermined size (N), involving the steps of: —receiving (10) one block of data; —determining (20) the size N associated to said block of data; The process further includes the steps of: —comparing (30) the size N of said block with at least a first predetermined threshold (N1); —if the size N shows to be superior than said first threshold (N1), execute the following steps: —storing (40) said block; —issuing (50) a NACK message to said NodeB; —accessing (60) a predetermined Look-Up-Table (LUT) with the value of N1 as an input and extracting a corresponding CQI value (CQI_LUT); —reporting (70) the CQI being the minimum between the CQI measured by the UE and said CQI_LUT value to said NodeB.

16 Claims, 8 Drawing Sheets

(56) References Cited

OTHER PUBLICATIONS

International Search Report in corresponding International Application No. PCT/EP2010/004077, mailing date Nov. 2, 2010.
Written Opinion of the International Searching Authority in corresponding International Application No. PCT/EP2010/004077, mailing date Nov. 2, 2010.

QUALCOMM: "Generic NACK compared with PLI and SLI" 3GPP Draft; S4-060614_GNACK_QCOM, 3rd Generation Partnership Project (3GPP), Mobile Competence Centre; 650, Route Des Lucioles; F-06921, Sophia Antipolis Cedex; France, vol. SA WG4, No. Athens, Greece; Nov. 1, 2006 [retrieved on Nov. 1, 2006], entire document, XP050288912.

* cited by examiner

Table 7D: CQI mapping table for UE category 10.

| CQI value | Transport Block Size | Number of HS-PDSCH | Modulation | Reference power adjustment Δ | $N_{IR}$ | $X_{RV}$ |
|---|---|---|---|---|---|---|
| 0 | N/A | Out of range | | | | |
| 1 | 137 | 1 | QPSK | 0 | 28800 | 0 |
| 2 | 173 | 1 | QPSK | 0 | | |
| 3 | 233 | 1 | QPSK | 0 | | |
| 4 | 317 | 1 | QPSK | 0 | | |
| 5 | 377 | 1 | QPSK | 0 | | |
| 6 | 461 | 1 | QPSK | 0 | | |
| 7 | 650 | 2 | QPSK | 0 | | |
| 8 | 792 | 2 | QPSK | 0 | | |
| 9 | 931 | 2 | QPSK | 0 | | |
| 10 | 1262 | 3 | QPSK | 0 | | |
| 11 | 1483 | 3 | QPSK | 0 | | |
| 12 | 1742 | 3 | QPSK | 0 | | |
| 13 | 2279 | 4 | QPSK | 0 | | |
| 14 | 2583 | 4 | QPSK | 0 | | |
| 15 | 3319 | 5 | QPSK | 0 | | |
| 16 | 3565 | 5 | 16-QAM | 0 | | |
| 17 | 4189 | 5 | 16-QAM | 0 | | |
| 18 | 4664 | 5 | 16-QAM | 0 | | |
| 19 | 5287 | 5 | 16-QAM | 0 | | |
| 20 | 5887 | 5 | 16-QAM | 0 | | |
| 21 | 6554 | 5 | 16-QAM | 0 | | |
| 22 | 7168 | 5 | 16-QAM | 0 | | |
| 23 | 9719 | 7 | 16-QAM | 0 | | |
| 24 | 11418 | 8 | 16-QAM | 0 | | |
| 25 | 14411 | 10 | 16-QAM | 0 | | |
| 26 | 17237 | 12 | 16-QAM | 0 | | |
| 27 | 21754 | 15 | 16-QAM | 0 | | |
| 28 | 23370 | 15 | 16-QAM | 0 | | |
| 29 | 24222 | 15 | 16-QAM | 0 | | |
| 30 | 25558 | 15 | 16-QAM | 0 | | |

Fig. 7

| Index | Maximum accepted TB Size (N2) | Reported CQI |
|---|---|---|
| 1 | 137 | 1 |
| 2 | 149 | 1 |
| 3 | 161 | 1 |
| 4 | 173 | 1 |
| 5 | 185 | 1 |
| 6 | 197 | 1 |
| 7 | 209 | 1 |
| 8 | 221 | 1 |
| 9 | 233 | 2 |
| 10 | 245 | 2 |
| 11 | 257 | 2 |
| 12 | 269 | 2 |
| 13 | 281 | 2 |
| 14 | 293 | 2 |
| 15 | 305 | 2 |
| 16 | 317 | 3 |
| 17 | 329 | 3 |
| 18 | 341 | 3 |
| 19 | 353 | 3 |
| 20 | 365 | 3 |
| 21 | 377 | 4 |
| 22 | 389 | 4 |
| 23 | 401 | 4 |
| 24 | 413 | 4 |
| 25 | 425 | 4 |
| 26 | 437 | 4 |
| 27 | 449 | 4 |
| 28 | 461 | 5 |
| 29 | 473 | 5 |
| 30 | 485 | 5 |
| 31 | 497 | 5 |
| 32 | 509 | 5 |
| 33 | 521 | 5 |
| 34 | 533 | 5 |
| 35 | 545 | 5 |
| 36 | 557 | 5 |
| 37 | 569 | 5 |
| 38 | 581 | 5 |
| 39 | 593 | 5 |
| 40 | 605 | 5 |
| 41 | 616 | 5 |
| 42 | 627 | 5 |
| 43 | 639 | 5 |
| 44 | 650 | 6 |
| 45 | 662 | 6 |
| 46 | 674 | 6 |
| 47 | 686 | 6 |
| 48 | 699 | 6 |
| 49 | 711 | 6 |
| 50 | 724 | 6 |
| 51 | 737 | 6 |
| 52 | 751 | 6 |
| 53 | 764 | 6 |
| 54 | 778 | 6 |
| 55 | 792 | 7 |
| 56 | 806 | 7 |
| 57 | 821 | 7 |
| 58 | 836 | 7 |
| 59 | 851 | 7 |
| 60 | 866 | 7 |
| 61 | 882 | 7 |
| 62 | 898 | 7 |
| 63 | 914 | 7 |
| 64 | 931 | 8 |
| 65 | 947 | 8 |
| 66 | 964 | 8 |
| 67 | 982 | 8 |
| 68 | 1000 | 8 |
| 69 | 1018 | 8 |
| 70 | 1036 | 8 |
| 71 | 1055 | 8 |
| 72 | 1074 | 8 |
| 73 | 1093 | 8 |
| 74 | 1113 | 8 |
| 75 | 1133 | 8 |
| 76 | 1154 | 8 |
| 77 | 1175 | 8 |
| 78 | 1196 | 8 |
| 79 | 1217 | 8 |
| 80 | 1239 | 8 |
| 81 | 1262 | 9 |
| 82 | 1285 | 9 |
| 83 | 1308 | 9 |
| 84 | 1331 | 9 |
| 85 | 1356 | 9 |
| 86 | 1380 | 9 |
| 87 | 1405 | 9 |
| 88 | 1430 | 9 |
| 89 | 1456 | 9 |
| 90 | 1483 | 10 |
| 91 | 1509 | 10 |
| 92 | 1537 | 10 |
| 93 | 1564 | 10 |
| 94 | 1593 | 10 |
| 95 | 1621 | 10 |
| 96 | 1651 | 10 |

Fig. 8A

| | | | | | | |
|---|---|---|---|---|---|---|
| 97 | 1681 | 10 | | 146 | 4042 | 15 |
| 98 | 1711 | 10 | | 147 | 4115 | 15 |
| 99 | 1742 | 11 | | 148 | 4189 | 16 |
| 100 | 1773 | 11 | | 149 | 4265 | 16 |
| 101 | 1805 | 11 | | 150 | 4342 | 16 |
| 102 | 1838 | 11 | | 151 | 4420 | 16 |
| 103 | 1871 | 11 | | 152 | 4500 | 16 |
| 104 | 1905 | 11 | | 153 | 4581 | 16 |
| 105 | 1939 | 11 | | 154 | 4664 | 17 |
| 106 | 1974 | 11 | | 155 | 4748 | 17 |
| 107 | 2010 | 11 | | 156 | 4834 | 17 |
| 108 | 2046 | 11 | | 157 | 4921 | 17 |
| 109 | 2083 | 11 | | 158 | 5010 | 17 |
| 110 | 2121 | 11 | | 159 | 5101 | 17 |
| 111 | 2159 | 11 | | 160 | 5193 | 17 |
| 112 | 2198 | 11 | | 161 | 5287 | 18 |
| 113 | 2238 | 11 | | 162 | 5382 | 18 |
| 114 | 2279 | 12 | | 163 | 5480 | 18 |
| 115 | 2320 | 12 | | 164 | 5579 | 18 |
| 116 | 2362 | 12 | | 165 | 5680 | 18 |
| 117 | 2404 | 12 | | 166 | 5782 | 18 |
| 118 | 2448 | 12 | | 167 | 5887 | 19 |
| 119 | 2492 | 12 | | 168 | 5993 | 19 |
| 120 | 2537 | 12 | | 169 | 6101 | 19 |
| 121 | 2583 | 13 | | 170 | 6211 | 19 |
| 122 | 2630 | 13 | | 171 | 6324 | 19 |
| 123 | 2677 | 13 | | 172 | 6438 | 19 |
| 124 | 2726 | 13 | | 173 | 6554 | 20 |
| 125 | 2775 | 13 | | 174 | 6673 | 20 |
| 126 | 2825 | 13 | | 175 | 6793 | 20 |
| 127 | 2876 | 13 | | 176 | 6916 | 20 |
| 128 | 2928 | 13 | | 177 | 7041 | 20 |
| 129 | 2981 | 13 | | 178 | 7168 | 21 |
| 130 | 3035 | 13 | | 179 | 7298 | 21 |
| 131 | 3090 | 13 | | 180 | 7430 | 21 |
| 132 | 3145 | 13 | | 181 | 7564 | 21 |
| 133 | 3202 | 13 | | 182 | 7700 | 21 |
| 134 | 3260 | 13 | | 183 | 7840 | 21 |
| 135 | 3319 | 14 | | 184 | 7981 | 21 |
| 136 | 3379 | 14 | | 185 | 8125 | 21 |
| 137 | 3440 | 14 | | 186 | 8272 | 21 |
| 138 | 3502 | 14 | | 187 | 8422 | 21 |
| 139 | 3565 | 15 | | 188 | 8574 | 21 |
| 140 | 3630 | 15 | | 189 | 8729 | 21 |
| 141 | 3695 | 15 | | 190 | 8886 | 21 |
| 142 | 3762 | 15 | | 191 | 9047 | 21 |
| 143 | 3830 | 15 | | 192 | 9210 | 21 |
| 144 | 3899 | 15 | | 193 | 9377 | 21 |
| 145 | 3970 | 15 | | 194 | 9546 | 21 |

Fig. 8B

| | | | | | | |
|---|---|---|---|---|---|---|
| 195 | 9719 | 22 | | 244 | 23370 | 27 |
| 196 | 9894 | 22 | | 245 | 23792 | 27 |
| 197 | 10073 | 22 | | 246 | 24222 | 28 |
| 198 | 10255 | 22 | | 247 | 24659 | 28 |
| 199 | 10440 | 22 | | 248 | 25105 | 28 |
| 200 | 10629 | 22 | | 249 | 25558 | 29 |
| 201 | 10821 | 22 | | 250 | 26020 | 29 |
| 202 | 11017 | 22 | | 251 | 26490 | 29 |
| 203 | 11216 | 22 | | 252 | 26969 | 29 |
| 204 | 11418 | 23 | | 253 | 27456 | 29 |
| 205 | 11625 | 23 | | 254 | 27952 | 29 |
| 206 | 11835 | 23 | | | | |
| 207 | 12048 | 23 | | | | |
| 208 | 12266 | 23 | | | | |
| 209 | 12488 | 23 | | | | |
| 210 | 12713 | 23 | | | | |
| 211 | 12943 | 23 | | | | |
| 212 | 13177 | 23 | | | | |
| 213 | 13415 | 23 | | | | |
| 214 | 13657 | 23 | | | | |
| 215 | 13904 | 23 | | | | |
| 216 | 14155 | 23 | | | | |
| 217 | 14411 | 24 | | | | |
| 218 | 14671 | 24 | | | | |
| 219 | 14936 | 24 | | | | |
| 220 | 15206 | 24 | | | | |
| 221 | 15481 | 24 | | | | |
| 222 | 15761 | 24 | | | | |
| 223 | 16045 | 24 | | | | |
| 224 | 16335 | 24 | | | | |
| 225 | 16630 | 24 | | | | |
| 226 | 16931 | 24 | | | | |
| 227 | 17237 | 25 | | | | |
| 228 | 17548 | 25 | | | | |
| 229 | 17865 | 25 | | | | |
| 230 | 18188 | 25 | | | | |
| 231 | 18517 | 25 | | | | |
| 232 | 18851 | 25 | | | | |
| 233 | 19192 | 25 | | | | |
| 234 | 19538 | 25 | | | | |
| 235 | 19891 | 25 | | | | |
| 236 | 20251 | 25 | | | | |
| 237 | 20617 | 25 | | | | |
| 238 | 20989 | 25 | | | | |
| 239 | 21368 | 25 | | | | |
| 240 | 21754 | 26 | | | | |
| 241 | 22147 | 26 | | | | |
| 242 | 22548 | 26 | | | | |
| 243 | 22955 | 26 | | | | |

Fig. 8C

PROCESS FOR CONTROLLING THE HSDPA DOWNLINK DATA RATE RECEIVED BY A USER EQUIPMENT

TECHNICAL FIELD

The invention relates generally to wireless communication and more particularly to a process for allowing a User Equipment (UE) in a wireless communication network to limit the HSDPA downlink data rate received from a NodeB.

BACKGROUND ART

Nowadays, various communication protocols are used to establish standard rules for data representation, signaling, authentication and error detection required to send information over communication channels. One of the communication protocols widely used today is the High-Speed Downlink Block Access (HSDPA) which is a technology upgrade to current Universal Mobile Telecommunications System (UMTS) networks.

High Speed Downlink Packet Access (HSDPA) is a packet based data service feature in WCDMA standard providing high speed downlink transmission and belonging in the High-Speed Packet Access (HSPA) family.

Specifically, HSDPA uses four channels for achieving downlink transmission. High-Speed Downlink Shared Channel (HS-DSCH) is a first channel (which is a transport channel) used to send blocks on the downlink to the User Equipments (UEs). High Speed-Shared Control Channel (HS-SCCH) informs the user that data will be sent on the HS-DSCH. Uplink High Speed-Dedicated Physical Control Channel (HS-DPCCH) is a third channel used to carry acknowledgment (ACK)/negative acknowledgement (NACK) information and current Channel Quality Indicator (CQI) of the UE. Finally, High Speed-Physical Downlink Shared Channel (HS-PDSCH) is a fourth channel used by the HSDPA and is added to UMTS in order to increase downlink data rate. It carries information from the HS-DSCH transport channel.

In HSDPA, the downlink data rate is determined by and is under the control of the NodeB which, parallely to the UE, performs its own calculation of the Channel Quality Indicator (CQI) corresponding to an Adaptive Modulation and Coding (AMC) determining the characteristics of the transmission. AMC consists in the three following parameters: a) number of High Speed-Physical Downlink Shared Channel (HS-PDSCH) codes, b) modulation and c) transport block size.

FIG. 7 shows an illustrative example of the CQI mapping table for UE category 10 and which is also described in GPP 25.214 (table 7D in the original document). It can be seen that an increasing transport block size corresponds to an increasing CQI value. Different CQI mapping tables exist for different UE categories.

Generally speaking, in order to achieve a sufficient compromise between a high data rate in the downlink link and a sufficient quality of data communication, the characteristics of the data transmission in the downlink are controlled by the NodeB so as to correspond to a Block Error Rate (BLER) equal to 10%, in accordance with the requirements defined by 3rd Generation Partnership Project (3GPP).

A Block Error Rate (BLER) of 10% on the HS-PDSCH corresponds to the number of negatively acknowledged blocks reported by the UE to the NodeB.

For inducing a BLER of 10%, NodeB selects a CQI (with the help of the CQI reported by the UE) that provides this BLER value and transmits to the UE an AMC corresponding to the selected CQI. For example, in 3GPP 25.214 table 7B, shown in FIG. 3, the NodeB may select a CQI value varying between 0 and 30 with a transport block size varying between 0 and 25558 respectively.

Although the quality of HSDPA data communication between a NodeB and an UE with a BLER around 10% is satisfactory, there may be cases where the data rate received by the UE can not be processed. As an example, the Digital Signal Processing (DSP) resources existing in the UE might be required by other applications and for processing other tasks. Also, there might be a temporary lack of DSP resources in the UE . . . .

In such a situation, there is a clear need to allow the UE to take some kind of control on the data rate received from the NodeB, while avoiding too much disturbance of the NodeB.

Known HSDPA mechanisms do not provide such flexibility and the UE is generally not allowed to limit in any way the data rate in the downlink when necessary or simply appropriate.

In the non published french patent application no 09/51385 filed on 5. March 2009 and entitled "Procédé de contrôle du conctionnement d'une unite de traitement d'un appareil de communication sans fil, et appareil de communication corrrespondant>> filed on behalf of ST WIRELESS SA, there is described a first technique for providing such control on the downlink data rate, which technique is based on the saturation of the CQI being reported by the UE to the NodeB and corresponds to a maximum value which the UE is prepared to process.

However, it should be noticed that many NodeBs might not take into consideration the particular value of CQI being reported by the UE and simply proceed with their own computation of the CQI. In that case, as illustrated in FIG. 3, there would be no limitation in the data rate and the NodeB would keep the control on the downlink data rate based on its own calculation of the CQI.

In such a context, there is a strong desire to propose an alternative solution to improve, in some way, the control of the HSDPA downlink data rate that the UE may have or wish to have, without significantly disturbing the NodeB.

SUMMARY OF THE INVENTION

It is an object of the present invention to provide a process allowing some control of the downlink data rate in a 3GPP HSDPA User equipment.

It is a further object of the present invention to provide a process for limiting, when appropriate, the downlink data rate of a HSDPA communication between a UE and a NodeB.

These and other objects of the invention are achieved by means of a process that allows a User Equipment (UE) in a wireless communication network to control the HSDPA downlink data rate received from a NodeB. The UE successively receives blocks (called transport blocks) of data having a predetermined size (N) and the above mentioned process involves the steps of:

receiving one block of data;
determining the size N associated to said block of data;
The process further involves the steps of:
comparing the size N of said block with at least a first predetermined threshold (N1);
if the size N shows to be strictly superior than said first threshold (N1), execute the following steps:
storing said block;
issuing a NACK message to said NodeB;

accessing a predetermined Look-Up-Table (LUT) with the value of N1 as an input and extracting a corresponding CQI value called CQI_LUT reporting a CQI value to said NodeB, said CQI value being derived from the actual CQI measured by the UE and said CQI_LUT Therefore, there is achieved a more effective control of the data rate in the downlink which can be determined by the User Equipment when it is necessary or appropriate to limit such data rate.

In one embodiment, more than two groups may be considered by using two threshold values N1 and N2 and, in that case, the LUT table is accessed by means of the N2 value in order to extract said CQI_LUT used for deriving the CQI value reported to the NodeB.

In one embodiment, the CQI value reported to the NodeB is equal to the minimum between the CQI measured by the UE and the CQI_LUT extracted from said LUT.

In one embodiment, the NACK message is issued without any decoding of said block.

Preferably, the process is based on the comparison of the size N with a first threshold, a second and a third threshold (N1, N2, N3).

There is thus arranged a first group which comprises blocks having a size N strictly superior to the first threshold (N1). A second group comprises the blocks which size is comprised within the range ]N2, N1]. A third group comprises the blocks which size belongs in the range ]N3, N2]. At last, a fourth group comprises the blocks which size is inferior or equal to the third threshold (N3).

In one embodiment, the processing of the blocks belonging to the second group involves the following steps:

computing a first Group Block Error Rate (GBLER) representative of the percentage of errors affecting the blocks (or part of the blocks) belonging to said second group;

comparing the first GBLER with a first predetermined GBLER threshold (GBLER1);

if the first GBLER of said block is inferior to said first GBLER threshold (GBLER1), execute the following steps:

storing the received block;

issuing a NACK message to said NodeB;

accessing a predetermined Look-Up-Table (LUT) with the value of N2 as an input and extracting a corresponding CQI value called CQI_LUT;

reporting a CQI value to said NodeB, said CQI value being derived from the actual CQI measured by the UE and said CQI_LUT if the first GBLER of said block shows to be superior than said first GBLER threshold (GBLER1), follow the steps of:

decoding the received block in order to determine the occurrence of an error affecting said block;

issuing an ACK or NACK message in accordance to said decoding.

access the LUT and report CQI in the same way as mentioned above

In one embodiment, the CQI value reported to the NodeB is equal to the minimum between the CQI measured by the UE and the CQI_LUT extracted from said LUT.

In both above cases, if a NACK has been issued, it shall be used to update the first GBLER for future blocks reception.

Preferably, the processing of the blocks belonging to the third group involves the following steps:

computing a second Group Block Error Rate (GBLER) representative of the percentage of errors affecting the blocks (or part of the blocks) belonging to said third group;

comparing the second GBLER with a second predetermined GBLER threshold (GBLER2) being inferior than said first GBLER threshold GBLER1;

if the second GBLER of said block is inferior to said second GBLER threshold (GBLER2), execute the following steps:

storing the received block;

issuing a NACK message to said NodeB;

accessing a predetermined Look-Up-Table (LUT) with the value of N2 as an input and extracting a corresponding CQI value called CQI_LUT;

reporting a CQI value to said NodeB, said CQI value being derived from the actual CQI measured by the UE and said CQI_LUT;

if said second GBLER of said block shows to be superior than said second GBLER threshold (GBLER2), follow the steps of:

decoding the block in order to determine the occurrence of an error affecting said block;

issuing a ACK or NACK message in accordance to said decoding access the LUT and report CQI in the same way as mentioned above In one embodiment, the CQI value reported to the NodeB is equal to the minimum between the CQI measured by the UE and the CQI_LUT extracted from is said LUT.

In both above cases, if a NACK has been issued, it shall be used to update the second GBLER for future blocks reception.

Preferably, the processing of the blocks belonging to the fourth group involves the following steps:

decoding the block in order to determining the possible occurrence of an error affecting said block;

issuing a ACK or NACK message in accordance to said decoding access the LUT and report CQI in the same way as mentioned above In one embodiment, the first GBLER threshold GBLER1 is set to a value approximately equal to 40% and the second GBLER threshold GBLER2 is set to a value approximately equal to 10%.

The invention also achieves a HSDPA User Equipment (UE) including a receiver for receiving blocks from a NodeB, characterized in that it further includes:

means for receiving one block of data;

means for determining the size N associated to said block of data;

means for comparing the size N of said block with at least a first predetermined threshold (N1);

means activated when the size N shows to be superior than the first threshold (N1), for executing the following steps:

storing (40) said block;

issuing (50) a NACK message to said NodeB;

accessing (60) a predetermined Look-Up-Table (LUT) with the value of N2 as an input and extracting a corresponding CQI parameter called CQI_LUT reporting (70) a CQI value to said NodeB, said CQI value being derived from the actual CQI measured by the UE and said CQI_LUT In one embodiment, the CQI value reported to the NodeB is equal to the minimum between the CQI measured by the UE and the CQI_LUT extracted from said LUT.

The invention is particularly adapted to the realization of a HSDPA mobile telephone.

DESCRIPTION OF THE DRAWINGS

Other features of one or more embodiments of the invention will best be understood by reference to the following detailed description when read in conjunction with the accompanying drawings.

Figure 2:
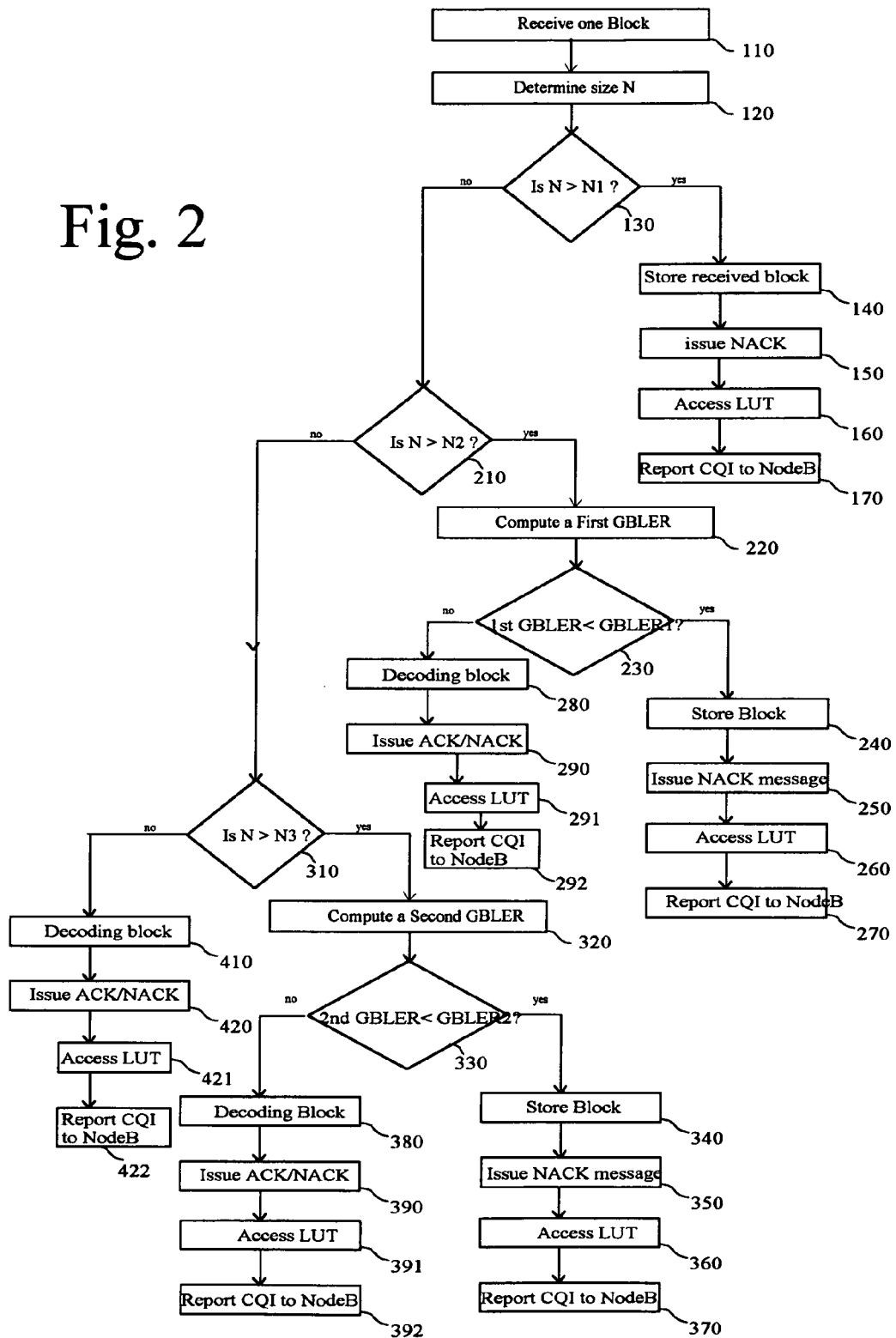

to FIG. 2 is a second embodiment of a process for limiting the data rate in the downlink.

Figure 3:
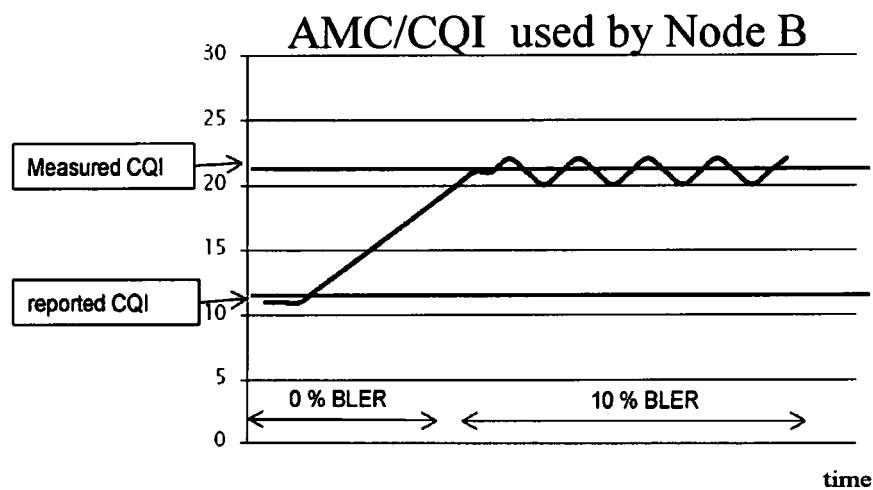

FIG. 3 is a flow chart illustrating the limited efficiency of the prior art method with some NodeB.

Figure 4:
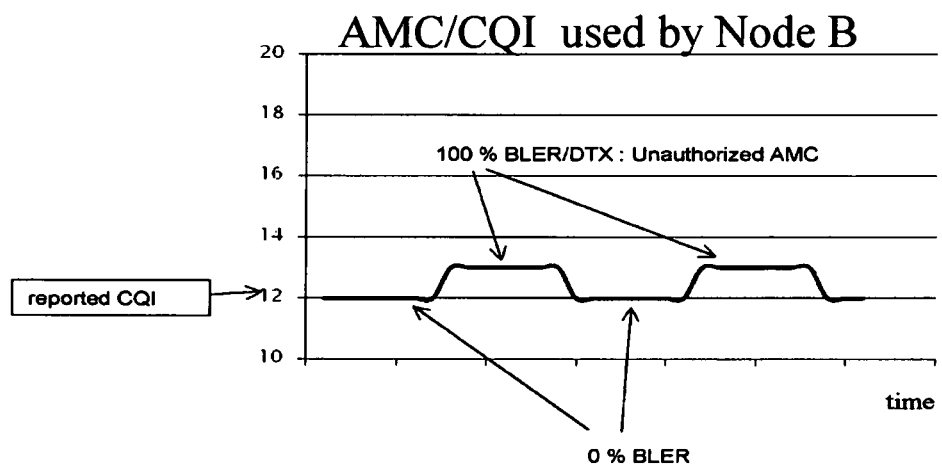

FIG. 4 illustrates the oscillation process between two extreme values "0%" and "100%" for the BLER in the first embodiment.

Figure 5:
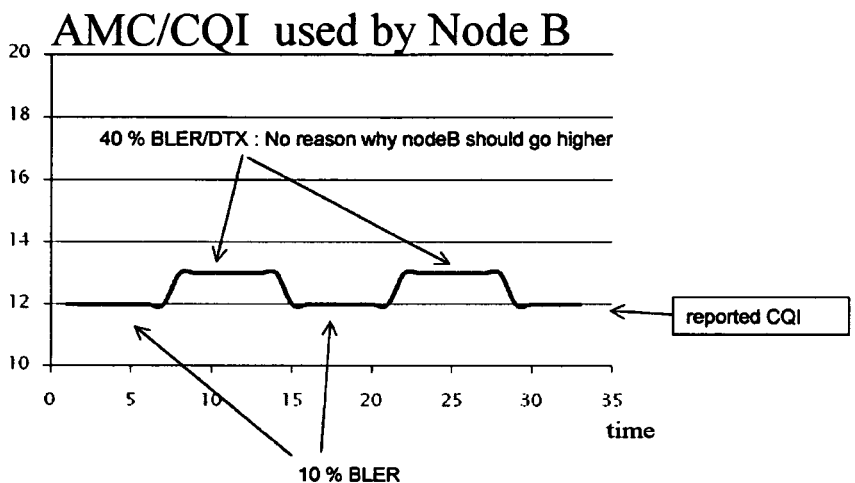

FIG. 5 illustrates the oscillation process of the BLER between two values 10% and 40% in the second embodiment.

Figure 6:
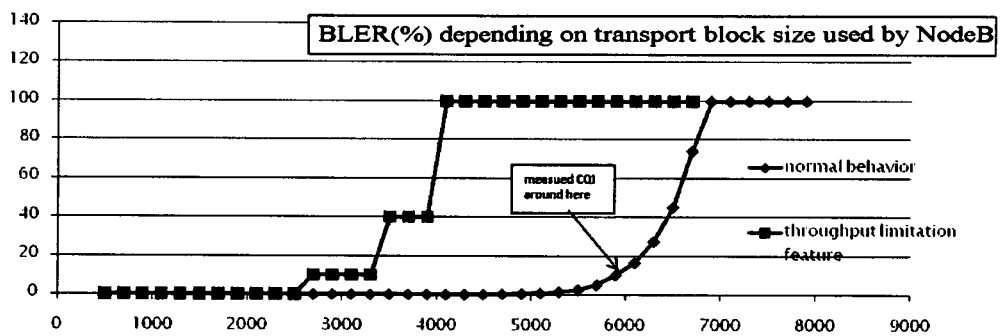

FIG. 6 illustrates the arrangement of four distinctive groups of blocks in distributed in accordance with their size used in the second embodiment.

FIG. 7 reminds the known CQI mapping table for UE category 10 as defined in the standardization documentation (3GPP 25.214 table 7B).

FIGS. 8A-8C show an example of the contents of the Look-Up-Table used in the second embodiment.

DESCRIPTION OF THE PREFERRED EMBODIMENT

In a HSDPA wireless communication network between a NodeB and a User Equipment (UE), the blocks of data transmitted to UE in the downlink have a size (N) determined by NodeB according to the AMC decision made by the latter with the help of the CQI reported by the UE.

Figure 1:
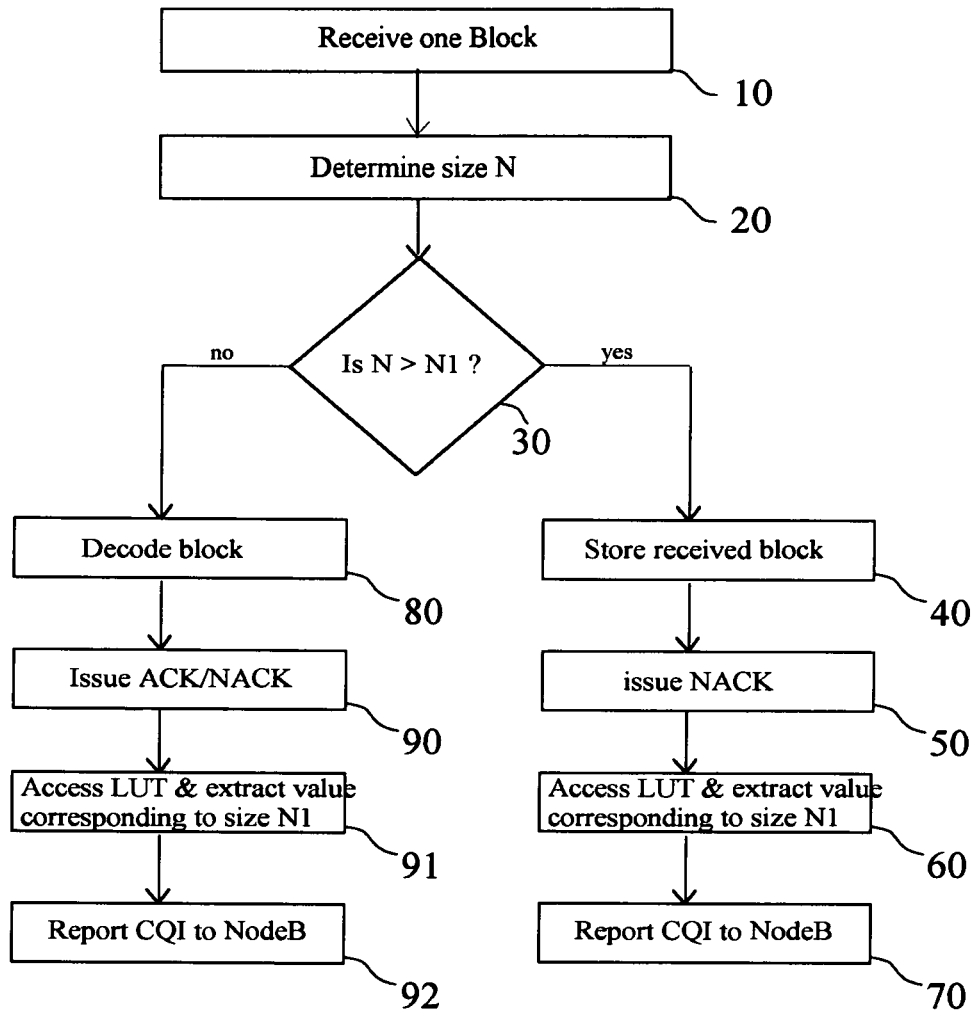
FIG. 1 illustrates one first embodiment of a process for limiting the data rate in the downlink.

With respect to FIG. 1, there is illustrated one embodiment of a process performed by a UE in order to take some control or temporary control of the HSDPA downlink data rate.

In a step 10 of this process, the UE receives one block from the NodeB in accordance with the known HSDPA protocol.

In a step 20, the process proceeds with the determination of the size N (transport block size) of the received block of data. As known by a skilled man, this determination of the size N is achieved by means of the use of the High Speed-Shared Control Channel (HS-SCCH).

In a step 30, the process performs a test and the size N of said block of data with at least a first predetermined threshold (N1). Generally speaking, the determination of the first threshold N1 is performed by the UE in accordance with its own requirements or in accordance with the level of the data rate in the downlink which it is prepared to accept. Practically, as a non limiting example, the UE may decide to to limit the data rate to 2 Mbps, what corresponds to an amount of 4000 bits for each 2-ms period.

If the size N of the received block is strictly superior to N1, then the process proceeds with a step 40 wherein the N-size block is stored by means of any conventional storing method.

Then, in a further step 50, the process issues a negative acknowledgement (NACK) message which is reported to the NodeB. One may notice that this NACK message will impact the BLER calculation process which is performed by the NodeB and will therefore allow to reduce the data rate. In the example being considered (N1=4000), the blocks having a size superior to 4000 bits are simply not accepted and a NACK message is reported to the NodeB.

In a step 60, the value of N1 is used as an input for accessing a predetermined Look-Up-Table (LUT), shown in FIGS. 8A to 8C, so as to extract one appropriate value CQI_LUT (third column in FIG. 8A to 8C) corresponding to that value of N1 (Second Column of FIG. 8A to 8C).

Finally, in a step 70, the process proceeds with the transmission to the NodeB of the particular value extracted from the said LUT through the appropriate signalling channel. More particularly, the value being reported to the NodeB is derived from the actual CQI measured by the UE and said CQI_LUT. In one particular embodiment, If the CQI measured by the UE is inferior to that value extracted from the LUT, it shall report the lowest value.

If the test of step 30 fails, the process proceeds to a step 80 wherein the received block is decoded in accordance with any conventional decoding method.

In accordance with such decoding, the UE proceeds, in a step 90, to the generation of a ACK or a NACK message which is then reported to the NodeB as conventionally.

Then, in a step 91, the value of N1 is used as an input for accessing the Look-Up-Table (LUT) as previously in step 60, ie for the purpose of extracting one appropriate value CQI_LUT corresponding to that value of N1 (Second Column of FIG. 8A to 8C).

Then, in a step 92, the process proceeds with the transmission to the NodeB of the particular value derived from the actual CQI measured by the UE and said CQI_LUT. More particularly, as previously, If the CQI measured by the UE is inferior to that value extracted from the LUT, it shall report the lowest value.

The first embodiment which was described above allows the UE to limit the data rate in the downlink because of the NACK message which is systematically generated as soon as the size N exceeds the value of the first threshold.

However, the process illustrated in FIG. 1 still shows a main drawback, resulting from the fact that the BLER value which is computed by the NodeB tends to oscillate between two extreme values, respectively 0 and 100 percent, as illustrated in FIG. 4 and discussed below.

Assuming for instance that the size N of blocks transmitted by the NodeB is superior to the threshold N1, the UE continuously sends NACK messages to the NodeB in order to limit blocks size N in accordance with steps 30-70 described above.

Accordingly, the BLER which is computed by the NodeB on the basis of those NACK messages tends to approach to 100%.

As a consequence, the NodeB may interpret this extreme value of the BLER as the condition of a bad transmission and may proceed with the limitation of the size N of the blocks transmitted.

As soon as the size N of the blocks falls below the value of N1, the UE will switch in the conventional decoding process of the blocks illustrated with steps 80 and 90 and, therefore, may expect to receive blocks without a significant level of errors. Consequently, a significant amount of ACK messages will be reported to the NodeB, thus resulting in a new calculation of the BLER which will now be close to 0%.

Because of this low BLER value which is now computed, the NodeB inevitably tends to increase again the size N of the blocks transmitted to the UE, which size then eventually exceeds threshold N1. As before, the UE starts again sending NACK messages to NodeB and one can observe that a BLER oscillation between 0% and 100% will take place, as shown in FIG. 4.

Clearly, the wide oscillation of the BLER between 0% and 100% severely degrades the downlink data communication. Indeed, while the transmission shows to be almost perfect when the BLER is close to 0%, it can be seen that, when the BLER value switches to a value close to 100%, the transmission is significantly deteriorated because of the multiple retransmission of blocks which has to occur.

Therefore, while the first embodiment of FIG. 1 still allows the UE to take some control of the data rate, there is still a drawback which needs to be solved.

This drawback is solved by the process which is illustrated in the second embodiment and which will now be described with details.

The second embodiment is based on the arrangement of four different groups distinguishing the blocks received and their processing thereof.

More particularly, there are defined at least three thresholds, namely a first threshold (N1), a second threshold (N2) and a third threshold (N3), with N3<N2<N1, are used for defining four groups in which blocks of size N transmitted by NodeB are included. Specifically, there is a first group comprising blocks having a size N strictly superior to said first threshold (N1), a second group comprising blocks with size N between said first and said second threshold ]N2, N1], a third group comprising blocks with size N between said second and said third threshold ]N3, N2] and a fourth group comprising blocks with size N inferior or equal to said third threshold (N3). The selection of the above mentioned thresholds is made by the UE and depends on the data rate which the UE is prepared to accept.

With respect to FIG. 2, it should be noticed that steps 110 to 170 corresponds to the processing of the blocks belonging to the first group and are identical to the steps 10 to 70 which were described in reference to FIG. 1 except that the threshold N2 should be taken for accessing the LUT.

Indeed, step 110 corresponds to the receiving of one block.

Step 120 corresponds to the determination of the size N of the block being received.

Step 130 corresponds to the test performed for comparing the value of N with the first threshold N1. If N<=N1, the process proceeds to a step 210 and otherwise the following steps 140-170 are successively performed when N>N1:

Step 140 corresponds to the storing of the received block;

Step 150 corresponds to the issuance of a NACK message to the NodeB;

Step 160 corresponds to the access of the LUT and the extraction of the appropriate CQI_LUT value used for deriving the reporting of the appropriate value CQI to the NodeB;

Step 170 corresponds to the reporting of that CQI value to the NodeB.

The second embodiment distinguishes over the first embodiment on the additional processing which are to be performed on blocks belonging to the second, the third and the fourth group, respectively.

Steps 210-292 correspond to the processing of the blocks belonging to the second group ]N2, N1].

Step 210 is a test for comparing the size N to the second threshold N2.

If N is strictly superior to N2, then the process goes to a step 220 and, otherwise it proceeds to a step 310.

In a step 220, the UE proceeds with the computation of a first Group BLock Error Rate (GBLER) which is computed on the basis of the errors detected by the UE (in accordance with any conventional error detecting mechanism) on all the blocks (or part of the blocks) belonging to the second group.

Then, in a step 230, the process compares the first GBLER with a first GBLER threshold (GBLER1) in order to determine if the former is inferior to the latter and, in that case, the process proceeds to a step 240. In practice, one may consider a value of 40% for the GBLER1

In step 240, the process stores the received block and then, in a step 250, a NACK message is issued and transmitted to the NodeB. This NACK message similarly to the first embodiment permits a control of the data rate which is transferred between the NodeB and the UE, and limits the throughput being transmitted by NodeB to a maximum value determined by the UE.

The process then proceeds to a step 260 wherein the above mentioned Look-Up-Table (LUT) (shown in FIG. 8A to 8C) is accessed in order to return the appropriate value of CQI corresponding to the size N2 of the received blocks.

In a step 270, the process then proceeds with the reporting to the NodeB of the CQI which is the minimum between measured CQI and value read from the LUT.

If the test of step 230 failed, then the process proceeds to a step 280 where the received block is decoded by the UE in accordance with any conventional decoding method.

In accordance with said decoding, the UE then stores the received block and issues in a step 290 a positive Acknowledgment (ACK) or a negative Acknowledgment (NACK) to the NodeB.

The process then proceeds to steps 291 and 292 which are identical to the step 160 and 170, that is to say that the LUT is accessed with the use of threshold N2.

Steps 310-390 correspond to the processing of the blocks belonging to the third grow ]N3, N2].

Step 310 is a test for comparing the size N to the third threshold N3.

If N is strictly superior to N3, then the process goes to a step 320 and, otherwise it proceeds to a step 410.

In a step 320, the UE proceeds with the computation of a second Group BLock Error Rate (GBLER) which is computed on the basis of the errors detected by the UE (in accordance with any conventional error detecting mechanism) on all the blocks belonging to the third group.

Then, in a step 330, the process compares the second GBLER with a second GBLER threshold (GBLER2) in order to determine if the former is inferior to the latter and, in that case, the process proceeds to a step 340. In practice, the second threshold value GBLER2 can be set to be equal to 10% which corresponds to the standardized value of the BLER conventionally used by the 3GPP.

In step 340 the UE stores the received block and, then, in a step 350 it issues a NACK message to the NodeB. As before, this NACK message permits a control of the data rate which is transmitted between the NodeB and the UE, and limits the throughput being transmitted by NodeB to a maximum value.

In a step 360, similarly to the step 260, the process proceeds with accessing the look-up-table with N2 as input for the purpose of extracting an appropriate CQI value and, in a step 370, reports to the NodeB the CQI value which is the minimum between the CQI measured by the UE and the value extracted from the LUT.

If the test of step 330 fails (ie if the GBLER is superior to the GBLER2), then the process proceeds to a step 380, for decoding the received block by means of any conventional decoding method.

In a further step 390, the UE determines the possible occurence of an error affecting the received block and, correspondingly, stores said block and reports an ACK or NACK message to the NodeB in accordance with the result of said decoding.

Then the process proceeds to steps 391 and 392 which are identical to the step 160 and 170, namely the access of the LUT with the value of N2 as an input.

If the test of step 310 failed, then the process proceeds to step 410 where the received block is decoded by the UE in accordance with any conventional decoding method.

In accordance with said decoding, the UE then stores the received block and issues in a step 420 a positive Acknowledgment (ACK) or a negative Acknowledgment (NACK) to the NodeB.

The process then proceeds to steps 421 and 422 which are identical to the step 160 and 170, that is to say that the LUT is accessed with the use of threshold N2.

It can be seen that the second embodiment shows an oscillation of the BLER between the two values of GBLER1 and GBLER2, for instance 40% and 10% respectively, as shown in FIG. 5.

FIG. 6 summarizes the arrangement of the four distinctive groups delimited by three particular thresholds defined as follows:

N1: 4000
N2: 3500
N3: 2500

The figure also shows the dependency of the BLER on the size (transport block size) used by the nodeB.

It can be seen that the process achieves the limitation of the data rate in the downlink, by controlling the transmission of ACK/NACK messages between the two above mentioned thresholds and the transport block sizes sent by the nodeB between the transport block size thresholds N1 and N2.

The second GBLER threshold GBLER2 is preferably chosen to have a value close to the rate of 10% in order to maintain the BLER value around 10% according to 3GPP. Generally, the first GBLER threshold GBLER1 may take values higher than 10% but significantly smaller than 100% in order to avoid unnecessary data retransmission by NodeB occurring when too many NACK messages are reported to the latter and maintain sufficient quality of data communication.

The invention claimed is:

1. A method for allowing a User Equipment (UE) in a wireless communication network to control a HSDPA downlink data rate received from a NodeB, said UE successively receiving blocks of data having a predetermined size, comprising the steps of:
   receiving one block of data;
   determining the size associated with said block of data;
   comparing the size of said block with at least a first threshold;
   if the size shows to be strictly superior than said first threshold, execute the following steps:
   storing said block;
   issuing a NACK message to said NodeB;
   accessing a Look-Up-Table (LUT) with the value of said first threshold as an input and extracting a corresponding CQI value (CQI_LUT); and
   reporting a CQI value to said NodeB, said CQI value being derived from a CQI measured by the UE and said corresponding CQI value (CQI_LUT).

2. The method according to claim 1 wherein more than two groups of block sizes based on the use of at least two threshold values comprising the first threshold and a second threshold are used and further comprising the step of accessing said Look-Up-Table (LUT) with the value of said second threshold for the purpose of extracting said corresponding CQI value (CQI_LUT) used for deriving the CQI value being reported to the Node B.

3. The method according to claim 1 wherein the CQI value reported to the NodeB is equal to the minimum of the CQI measured by the UE and the corresponding CQI value (CQI_LUT) extracted from said Look-Up-Table (LUT).

4. The method according to claim 1 further comprising comparing said size with the first threshold, a second threshold and a third threshold, thereby creating four distinctive groups:
   a first group of block sizes comprising block sizes strictly superior to said first threshold;
   a second group of block sizes comprising block sizes inferior or equal to said first and strictly superior to said second threshold;
   a third group of block sizes comprising block sizes inferior or equal to said second and strictly superior to said third threshold; and
   a fourth group of block sizes comprising block sizes inferior or equal to said third threshold.

5. The method according to claim 4 wherein a block with a size which belongs to said second group is subject to the following processing:
   compute a first Group Block Error Rate (GBLER) representative of the percentage of errors affecting the blocks belonging to said second group;
   compare said first GBLER with a first predetermined GBLER threshold (GBLER1);
   if the first Group Block Error Rate (GBLER) of said block is inferior to said first GBLER threshold (GBLER1), execute the following steps:
   storing said block;
   issuing a NACK message to said NodeB;
   accessing a predetermined Look-Up-Table (LUT) with the value of the second threshold as an input and extracting a corresponding CQI value (CQI_LUT); and
   reporting the CQI being the minimum of the CQI measured by the UE and said corresponding CQI value (CQI_LUT) to said NodeB;
   if said first Group Block Error Rate (GBLER) of said block shows to be superior than said first GBLER threshold (GBLER1), follow the steps of:
   decoding said block in order to determine the occurrence of an error affecting said block;
   issuing a ACK or NACK message in accordance to said decoding
   accessing said predetermined Look-Up-Table (LUT) with the value of said second threshold as an input and extracting a corresponding CQI value (CQI_LUT); and
   reporting a CQI value to said NodeB, said CQI value being derived from a CQI measured by the UE and said corresponding CQI value (CQI_LUT).

6. The method according to claim 5 wherein a block with a size which belongs to said third group is subject to the following processing:
   compute a second Group Block Error Rate (GBLER) representative of the percentage of errors affecting the blocks belonging to said third group;
   compare said second GBLER with a second predetermined GBLER threshold (GBLER2) being inferior than said first GBLER threshold GBLER1;
   if the second Group Block Error Rate (GBLER) of said block is inferior to said first GBLER threshold (GBLER1), execute the following steps:
   storing said block;
   issuing a NACK message to said NodeB;
   accessing a predetermined Look-Up-Table (LUT) with the value of the second threshold as an input and extracting a corresponding CQI value (CQI_LUT); and
   reporting the CQI being the minimum of the CQI measured by the UE and said corresponding CQI value (CQI_LUT) to said NodeB;

if said second Group Block Error Rate (GBLER) of said block shows to be superior than said second GBLER threshold (GBLER2), follow the steps of:
  decoding said block in order to determine the occurrence of an error affecting said block;
  issuing a ACK or NACK message in accordance to said decoding;
  accessing said predetermined Look-Up-Table (LUT) with the value of said second threshold as an input and extracting a corresponding CQI value (CQI_LUT); and
  reporting a CQI value to said NodeB, said CQI value being derived from a CQI measured by the UE and said corresponding CQI value (CQI_LUT).

7. The method according to claim 6 wherein a block which belongs to said fourth group is subject to the following processing:
  decoding said block in order to determining the possible occurrence of an error affecting said block;
  issuing a ACK or NACK message in accordance to said decoding;
  accessing said predetermined Look-Up-Table (LUT) with the value of said second threshold as an input and extracting a corresponding CQI value (CQI_LUT); and
  reporting a CQI value to said NodeB, said CQI value being derived from a CQI measured by the UE and said corresponding CQI value (CQI_LUT).

8. The method in accordance with claim 6 wherein said first GBLER threshold (GBLER1) is set to a value equal to 40%.

9. The method in accordance with claim 6 wherein said second GBLER threshold (GBLER2) is set to a value equal to 10%.

10. A method, comprising the steps of:
  receiving at a user equipment a block of data from a NodeB;
  determining whether a size of the block of data exceeds a first threshold; and
  if so, then:
    storing the block of data;
    issuing a NACK message to said NodeB;
    extracting from a look-up table a first CQI value corresponding to said first threshold;
    deriving a second CQI value from a user equipment measured CQI value and said first CQI value; and
    reporting the second CQI value to said NodeB.

11. The method of claim 10, wherein deriving comprises selecting said second CQI value as a minimum of the measured CQI value and said first CQI value.

12. The method of claim 10, wherein issuing said NACK message comprises issuing the NACK message without decoding said block of data.

13. A method, comprising the steps of:
  receiving at a user equipment a block of data from a NodeB;
  determining whether a size of the block of data is between a first threshold and second threshold; and
  if so, then:
    computing a Group Block Error Rate (GBLER) representative of a percentage of errors affecting the block of data;
    determining if the GBLER is less than a GBLER threshold;
    if so, then:
      storing said block of data;
      issuing a NACK message to said NodeB;
      extracting from a look-up table a first CQI value corresponding to said second threshold;
      deriving a second CQI value from a user equipment measured CQI value and said first CQI value; and
      reporting the second CQI value to said NodeB.

14. The method of claim 13, wherein deriving comprises selecting said second CQI value as a minimum of the measured CQI value and said first CQI value.

15. A method, comprising the steps of:
  receiving at a user equipment a block of data from a NodeB;
  determining whether a size of the block of data is between a first threshold and second threshold; and
  if so, then:
    computing a Group Block Error Rate (GBLER) representative of a percentage of errors affecting the block of data;
    determining if the GBLER is not less than a BGLER threshold;
    if so, then:
      decoding said block of data in order to determine the occurrence of an error affecting said block of data;
      issuing an ACK or a NACK message in accordance with a result of said decoding;
      extracting from the look-up table the first CQI value corresponding to said second threshold;
      deriving the second CQI value from the measured CQI value and said first CQI value; and
      reporting the second CQI value to said NodeB.

16. The method of claim 15, wherein deriving comprises selecting said second CQI value as a minimum of the measured CQI value and said first CQI value.

* * * * *